US005185194A

United States Patent [19]

Miyake et al.

[11] Patent Number: 5,185,194

[45] Date of Patent: Feb. 9, 1993

[54] HEAT-MODE RECORDING MEDIUM

[75] Inventors: Ryohei Miyake, Tokyo; Kyoji Tsutsui, Mishima, both of Japan

[73] Assignee: Ricoh Company, Ltd., Tokyo, Japan

[21] Appl. No.: 500,584

[22] Filed: Mar. 28, 1990

[30] Foreign Application Priority Data

Mar. 31, 1989 [JP] Japan .................................... 1-82331
May 29, 1989 [JP] Japan .................................... 1-135576

[51] Int. Cl.$^5$ .................................... B32B 3/00

[52] U.S. Cl. .................................... 428/64; 428/65; 428/195; 428/411.1; 428/522; 428/913; 430/945

[58] Field of Search .................... 428/195, 411.1, 522, 428/913, 64, 65; 430/945

[56] References Cited

U.S. PATENT DOCUMENTS 4,349,611 9/1982 Miyakawa et al. .............. 428/411.1
4,567,113 1/1986 Ohtsu et al. .......................... 428/913
4,572,860 2/1986 Nakamura et al. ................. 428/522
4,824,721 4/1989 Fujita et al. .......................... 428/195
4,882,218 11/1989 Koshizuka et al. ................. 428/195
4,894,288 1/1990 Fukuda et al. ....................... 428/195

*Primary Examiner*—B. Hamilton Hess
*Assistant Examiner*—Elizabeth Evans
*Attorney, Agent, or Firm*—Oblon, Spivak, McClelland, Maier & Neustadt

[57] ABSTRACT

A heat-mode recording medium has (i) a substrate and (ii) a recording layer formed thereon which comprises an organic compound of which crystallization direction can be thermally and reversibly controlled. This heat-mode recording medium can be prepared or initialized by at least the steps of fusing the organic compound contained in the recording layer with application of heat thereto and subsequently cooling a predetermined fused portion of the recording layer in such a fashion that the crystallization direction of the organic compound in the recording layer is oriented in a predetermined direction.

27 Claims, 9 Drawing Sheets

HEAT-MODE RECORDING MEDIUM

BACKGROUND OF THE INVENTION

1. Field of the Invention

The present invention relates to a heat-mode recording medium comprising an organic recording layer capable of recording information by the application of heat thereto or irradiation of light, and more particularly to a heat-mode recording medium capable of recording information by utilizing the change in the crystallization states of the above-mentioned organic recording layer.

2. Discussion of Background

A heat-mode recording system, which enables information to be recorded therein by applying thermal energy thereto and changing the configuration or physical properties of a recording layer of the recording medium, has lately been put to practical use.

The above-mentioned recording media can be classified into an inorganic-type recording medium and an organic one. The inorganic-type recording medium comprises a metallic material consisting essentially of Te, Bi, Se, Tb or In. On the other hand, the organic-type recording medium comprises an organic dyestuff, for example, polymethine-type dyes such cyanine dye; or macrocyclic azanulene-type dyes such as phthalocyanine dye, naphthalocyanine dye and porphyrin dye; naphthoquinone dyes anthraquinone dyes; and dithiol metal complex type dyes.

When the thermal energy is applied to the above-mentioned recording medium by projecting a converged laser beam onto the recording medium, a portion of a recording layer where the laser beam is applied is fused or evaporated to form a pit, which enables information to be recorded therein. However, those recording media has no reversibility of erasing the recorded information and recording another information.

As the development of the aforementioned reproduction-only or write-once heat-mode optical recording media, a need for a reversible recording medium capable of recording, reproducing and erasing information becomes pressing.

As the above reversible recording medium, there is known a magneto-optical recording medium comprising a thin layer made of an alloy of a rare earth metal such as Gd, Tb or Dy and a transition metal such as Fe, Ni or Co. The magneto-optical recording medium, however, has the shortcoming that the sensitivity is not so high that the S/N ratio in reproduction is still poor. In addition to the above, the recording sensitivity is gradually deteriorated because the recording medium is oxidized with time, so that high recording stability cannot be obtained.

Furthermore, there is known a reversible recording medium which comprises an inorganic recording layer essentially consisting of an inorganic material such as Ge, Te, Se, Sb, In and Sn. In this reversible recording medium, information can be recorded by taking advantage of the phase transition from a crystalline phase to an amorphous phase of the recording layer. This reversible recording medium can perform the recording and erasing operation in a heat-mode only by applying a laser beam thereto. However, in the recording layer of the above reversible recording medium, a recorded area cannot offer a sufficient contrast to a non-recorded area, which cannot stabilize the recording operation. In addition to this, the above-mentioned reversible recording medium has the shortcoming that the materials for the recording layer themselves are not stable.

Furthermore, a method of preparing a recording medium which comprises an organic recording layer comprising a fatty acid o fatty acid derivative is disclosed in Japanese Laid-Open Patent Application 63-289354. By this method, a predetermined amount of a fatty acid or derivative thereof is fused on a substrate by increasing the temperature of the substrate higher than the melting point of the employed fatty acid or fatty acid derivative. Another substrate is placed on the fused fatty acid or derivative thereof, with a pressure applied to the upper substrate side, to spread the fused solution of the fatty acid or derivative thereof between a pair of substrates. By cooling the substrates and the fused solution of the fatty acid or derivative thereof sandwiched therebetween, as a whole, a recording medium can be prepared in such a fashion that a recording layer comprising a fatty acid or derivative thereof is interposed between a pair of substrates.

The thus prepared recording medium is allowed to stand in a constant temperature bath maintained at a temperature higher than the melting point of the employed fatty acid or derivative thereof for several hours, while a pressure is uniformly applied to the recording medium by placing a weight thereon. After several hours, the temperature of the constant temperature bath is lowered at a fixed rate. As a result, the fused fatty acid or derivative thereof interposed between a pair of substrates is crystallized, and a recording medium comprising a pair of substrates and an organic layer interposed therebetween, as shown in FIG. 1, can be initialized. The thus formed organic layer is excellent with respect to the uniformity of its thickness and refractive index.

However, in the process of crystallizing the above-mentioned organic recording layer, the phase transition of the organic recording layer from a fused state to a crystalline state proceeds as the crystalline nucleuses are spontaneously formed in the fused organic recording layer and then grow in the course of cooling. In the above-mentioned method of preparing the recording medium, numerous crystalline domains tend to be oriented in different directions, as shown in FIG. 2, because the organic recording layer is crystallized by polynuclear growth of crystals. This is not always suitable for precise recording of information.

SUMMARY OF THE INVENTION

Accordingly, an object of the present invention is to provide a heat-mode recording medium comprising an organic recording layer, free from the above-mentioned conventional shortcomings, which is capable of recording, reproducing and erasing information at a high speed and high contrast and density, and exhibiting the stability over a long period of time.

This object of the present invention can be achieved by a heat-mode recording medium comprising a substrate and a recording layer formed on the substrate which comprises an organic compound whose crystallization direction can be thermally and reversibly controlled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A heat-mode recording medium according to the present invention comprises (i) a substrate and (ii) a recording layer formed on the substrate which comprises an organic compound whose crystallization direction can be thermally and reversibly controlled.

The heat-mode recording medium according to the present invention performs the recording and reproduction of information, taking advantage of the change in crystalline states of the above-mentioned organic compound. More specifically, when a portion of the recording layer is heated under application of heat thereto, the crystalline state of the heated portion is changed, which permits information to be recorded therein. The above portion is then heated again to an appropriate temperature. As a result, the heated portion is returned to its original state, by which the recorded information is erased. Information can be thus recorded in the heat-mode recording medium according to the present invention and erased therefrom in the aforementioned manner.

In the recording layer of the heat-mode recording medium according to the present invention, an organic compound is crystallized in a thin film. Numerous crystalline domains of the organic compound, which constitute the recording layer as a whole, are almost uniformly oriented in a predetermined direction parallel to the substrate. For example, when the recording medium is disc-shaped, each crystalline domain can be oriented radially from the center of the substrate of the recording medium, or oriented in a tangential direction of concentric circles having the center at the center of the substrate, that is, in a circumferential direction of the recording medium.

To prepare the heat-mode recording medium according to the present invention comprising the above-mentioned organic recording layer, an organic material for a recording layer is formed in a thin film on a substrate, and fused under application of heat thereto while it is still in a thin film. After fused, the material is then crystallized, for example, outward or inward in a radial direction from the center of the substrate, or in a circumferential direction.

Figure 1:
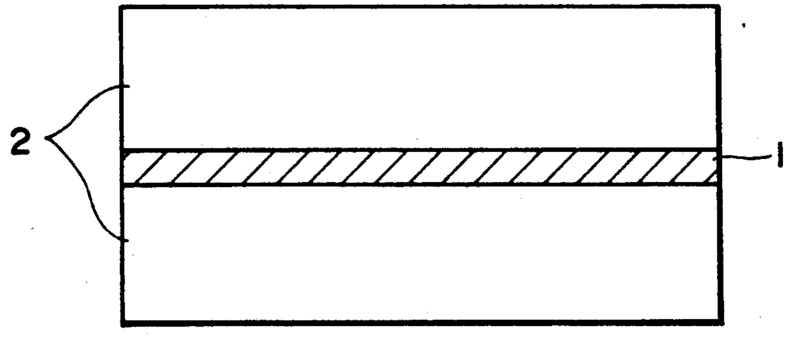
FIG. 1 PRIOR ART
FIG. 1 is a schematic cross-sectional view of a conventional recording medium comprising a pair of substrates and an organic layer.
Figure 2:
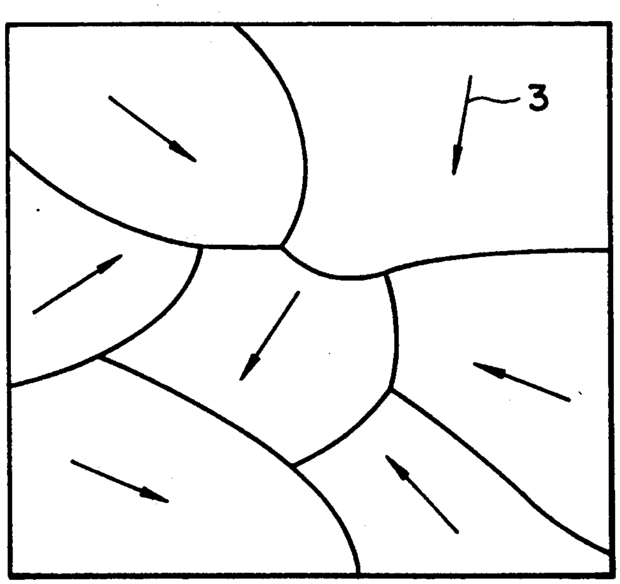
FIG. 2 PRIOR ART
FIG. 2 is a schematic illustration of the crystallized state of the organic layer of the recording medium shown in FIG. 1.
Figure 3:
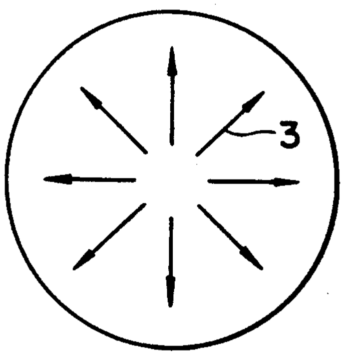
FIG. 3 is a schematic plan view of an organic layer of a disk-shaped heat-mode recording medium according to the present invention, which is intensively cooled from the center thereof.

To prepare a disk-shaped sandwich-type recording medium, generally employed as an optical disk, an organic material whose crystallization direction ca be thermally and reversibly controlled is placed between a pair of substrates and fused under application of heat thereto to form the organic compound into a thin film, whereby a recording layer is provided between the substrates. The thus prepared substrates and the recording layer are then placed in a supercooling state and the center of the recording layer is intensively cooled to cause the crystal growth in such a fashion that optical axes 3 of crystallized organic compound are radially directed from the center of the recording layer, as shown in FIG. 3. The thus obtained disk-shaped heat-mode recording medium shows uniform optical characteristics at any position along the circumferential direction thereof. For practical use, a hole is bored in the center of the recording medium to attach a hub for a magnetic cramp, so that a disk-shaped heat-mode recording medium which is rotatable in the practical operation can be obtained.

Preferable examples of the heat-mode recording medium according to the present invention are shown in FIGS. 4 to 8.

Figure 4:
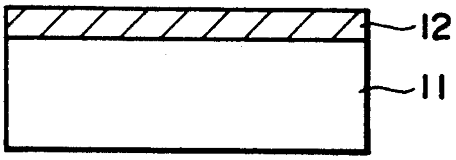
FIG. 4 to FIG. 8 are schematic cross-sectional views of examples of a heat-mode recording medium according to the present invention.

A heat-mode recording medium according to the present invention as shown in FIG. 4 comprises a substrate 11 and a recording layer 12, formed on the substrate 11, comprising an organic compound crystallized in a thin film. The orientation of the above crystallized organic compound is almost uniform, with respect to a direction along the substrate 11.

Figure 5:
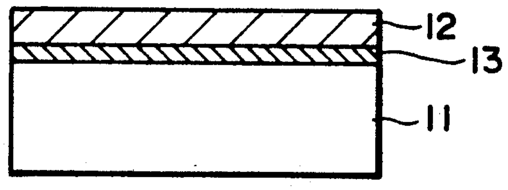

A heat-mode recording medium according to the present invention as shown in FIG. 5 is constructed in such a fashion that (i) a light-to-heat conversion layer 13 capable of absorbing a part or entirety of the light applied thereto in a recording operation and converting the absorbed light into thermal energy, and (ii) a recording layer 12 are successively overlaid on a substrate 11. The above light-to-heat conversion layer 13 also performs the function of reflecting part of light applied thereto when necessary.

Figure 6:
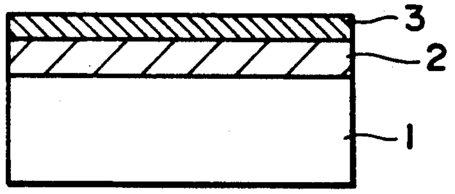

A heat-mode recording medium according to the present invention as shown in FIG. 6 is constructed in such a fashion that a recording layer 12 and a light-to-heat conversion layer 13 are successively overlaid on a substrate 11.

Figure 7:
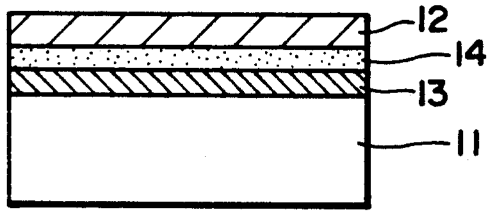

In a heat-mode recording medium according to the present invention as shown in FIG. 7, an undercoat layer 14 is additionally interposed between the same light-to-heat conversion layer 13 and recording layer 12 as those employed in FIG. 5 to control the crystallization direction of the organic compound contained in the recording layer 12 and improve the uniformity of crystals of the organic compound.

Figure 8:
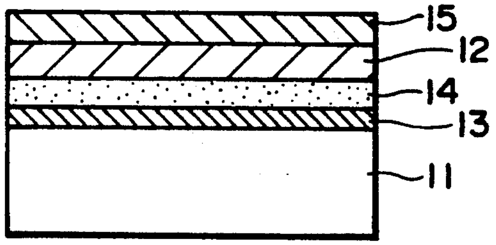

A heat-mode recording medium according to the present invention as shown in FIG. 8 further comprises a protective layer 15 which is provided on the same recording layer 13 as that employed in FIG. 7.

As previously mentioned, the recording layer of the heat-mode recording medium according to the present invention is a thin film composed of numerous crystalline domains, each being almost uniformly oriented in a direction parallel to a disk-shaped substrate. For example, each crystalline domain is oriented in a radial direction from the center of the substrate, or in a tangential direction to a circle identified with a circumference of the disk-shaped substrate.

The orientation of crystalline domains in the recording layer will be explained in detail by referring to FIG. 9.

Figure 9:
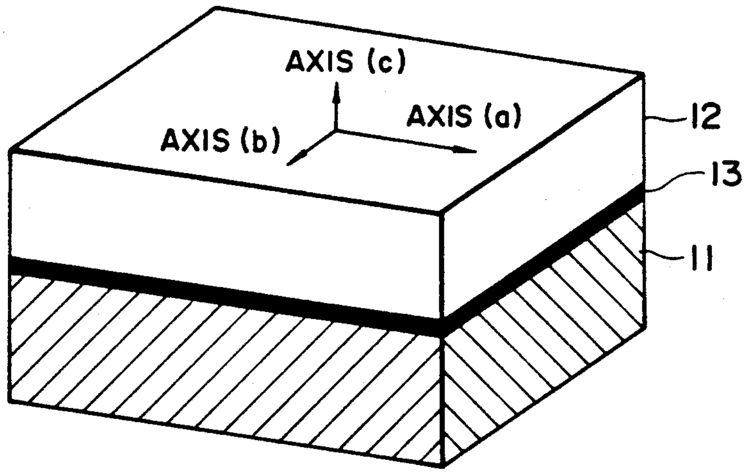
FIG. 9 is a perspective view of a heat-mode recording medium according to the present invention which exemplarily illustrates the directions of crystallographic axes of a crystalline domain contained in an organic recording layer.
Figure 10:
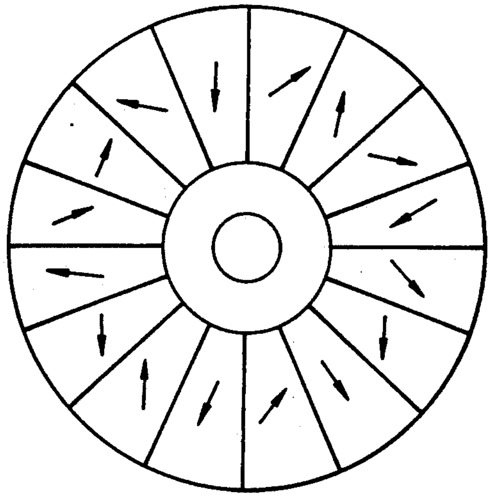
FIG. 10 is a schematic plan view of an organic layer of a heat-mode recording medium in which each crystalline domain is oriented in different directions.
Figure 11:
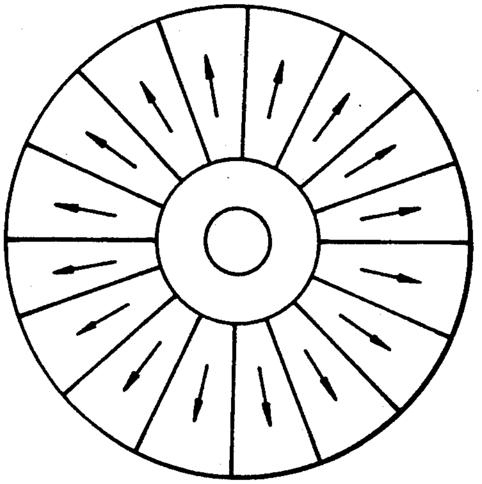
FIG. 11 is a schematic plan view of an organic layer of a heat-mode recording medium according to the present invention in which each crystalline domain is oriented in a radial direction.
Figure 12:
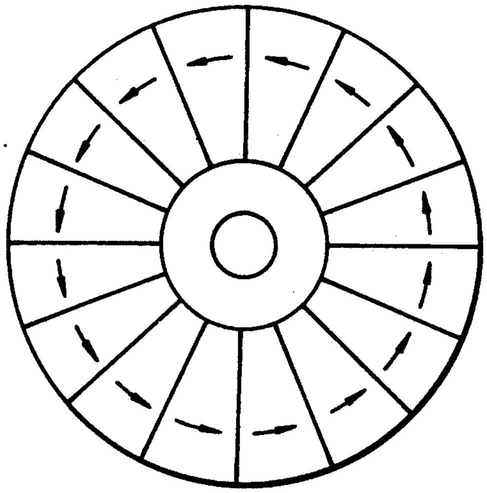
FIG. 12 is a schematic plan view of an organic layer of a heat-mode recording medium according to the present invention in which each crystalline domain is oriented in a tangential direction or a circumferential direction.

As shown in FIG. 9, a light-to-heat conversion layer 13 and a recording layer 12 are successively overlaid on a substrate 11. For example, when each crystalline domain is oriented, having crystallographic axes (a) and (b) in parallel with the substrate 11, and another crystallographic axis (c) directed perpendicular to the substrate 11, the entire crystalline domains contained in the recording layer 12 are oriented as shown in FIG. 9. Furthermore, in the present invention, the crystallographic axes (a) and (b) in parallel with the substrate are almost regularly oriented, not as in FIG. 10 where an axis (a) of each crystalline domain is pointed to different directions. A crystallographic axis (a) of each crystalline domain is regularly oriented, for example, in a radial direction, as shown in FIG. 11, or in a tangential or circumferential direction as shown in FIG. 12. The orientation direction of crystalline domains is not limited to the above, but it may be regularly oriented at a predetermined angle.

In the heat-mode recording medium according to the present invention, a recording operation can be basically performed on the principle that the crystalline state of a thin-film recording layer is partially changed by the application of heat thereto. When a heat-mode recording medium constructed in such a manner that a light-to-heat conversion layer and a recording layer are overlaid on a substrate is employed, the light-to-heat conversion layer can become exothermic by application of a laser beam thereto only for a short period of time, and a portion of crystallized organic compound of a thin-film recording layer is fused by the thermal energy from the light-to-heat conversion layer. Subsequently the fused portion of the recording layer is cooled for recrystallization thereof. As a result, the state of the recrystallized portion becomes different from the neighboring crystallized state, whereby information is recorded in the heat-mode recording medium according to the present invention.

The changes of the crystalline state of the recording layer generally include the changes in the crystalline form, the crystallographic structure, for example, inclination to an amorphous state, the direction of crystallographic axes, the orientation direction of molecules, and the crystalline size and shape.

The above-mentioned changes of the crystalline state of the recording layer is accompanied by the change of polarization characteristics thereof, and therefore it is preferable that the polarized light be employed for reproducing recorded information. Generally, when information is recorded and reproduced by taking advantage of the changes in the optical anisotropy of crystals, it is necessary that the relation between the vibrating direction of the employed polarized light which is projected onto the recording medium to reproduce information and the orientation direction of a crystallized organic compound of the thin-film recording layer be almost constant in any positions on the recording medium. The polarized light for reproduction is applied to the recording medium and reflected thereby or transmitted therethrough, and then detected by a polarizer. By the intensity of the light detected by the polarizer, the presence or absence of recorded information can be read out. Therefore, if the aforementioned relation is not constant in the entire positions on the recording medium, the intensity of the light reflected from a non-recorded portion of the recording layer is considerably changed, so that information cannot be accurately reproduced.

In the case where information is recorded in a disk-shaped heat-mode recording medium along the circumference thereof or in a spiral manner, with the recording medium being rotated, and information is reproduced therefrom by using the polarized light having a fixed vibration direction, it is essential that the changes in intensity of the light reflected from a non-recorded portion of the recording layer be minimal when measured at any positions on the recording medium. In the recording layer of the heat-mode recording medium according to the present invention, an organic compound is crystallized in a thin film, each crystalline domain being almost regularly oriented, for example, in a radial direction of the disk-shaped recording medium or in a tangential or circumferential direction thereof. Accordingly, when the recording medium is rotated, the relative relationship between the vibrating direction of the employed polarized light for reproduction and the orientation direction of the crystalline domains of the thin-film recording layer can be almost constantly maintained, so that recorded information can be accurately reproduced, without much changes in the intensity of the light detected from the non-recorded portion.

The materials for the recording layer of the heat-mode recording medium according to the present invention may be selected from a variety of compounds which can be crystallized in a thin film. Specific examples of the above compounds for use in the recording layer include fatty acids and derivatives thereof, benzoic acid derivatives and n-alkanes having a melting point of 50° C. or more. These compounds are not limited to the above compounds.

The above-mentioned fatty acids are saturated or unsaturated mono- or di-carboxylic acids.

The fatty acid derivatives include esters, amides, anilides, hydrazides, ureidos, unhydrides, ammonium salts or metallic salts of saturated or unsaturated mono- or di-carboxylic acids. The above-mentioned esters of the saturated or unsaturated mono- or di-carboxylic acid are esters of compounds having two or more hydroxyl groups, including mono-, di-, or triglyceride, which may have a substituent such as a halogen, a hydroxyl group, an acyl group, an acyloxyl group or a substituted or unsubstituted aryl group.

The saturated or unsaturated fatty acids for use in the present invention may be straight-chain or branched, and the unsaturated fatty acids may have one double-bond or triple-bond or two or more double-bond or triple-bond.

The fatty acids having 10 or more carbon atoms in a hydrocarbon chain can be employed in the present invention. In particular, it is preferable that the fatty acids for use in the present invention have 10 to 60 carbon atoms, and more preferably 10 to 38 carbon atoms.

Specific examples of the saturated fatty acids are undecanoic acid, lauric acid, myristic acid, pentadecanoic acid, palmitic acid, heptadecanoic acid, stearic acid, nonadecanoic acid. arachic acid, behenic acid, lignoceric acid, cerotic acid, montanic acid and melissic acid.

Specific examples of the unsaturated fatty acids are oleic acid, elaidic acid, linoleic acid, sorbic acid and stearolic acid.

As the esters of the fatty acids or derivatives thereof, methyl ester, ethyl ester, hexyl ester, octyl ester, decyl ester, dodecyl ester, tetradecyl ester, stearyl ester, eicosyl ester and dococyl ester of the saturated or unsaturated mono- or di-carboxylic acid can be employed.

As the metallic salts of the fatty acids or derivatives thereof, sodium, potassium, magnesium, calcium, nickel, cobalt, zinc, cadmium and aluminum salt of the saturated or unsaturated mono- or di-carboxylic acid can be employed.

The above-mentioned benzoic acid derivatives for use in the present invention, including benzoic acids, and esters, amides and anilides thereof, are represented by the following formulas:

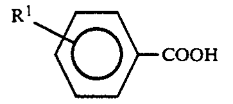
(I)

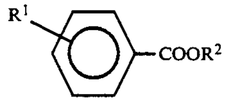
(II)

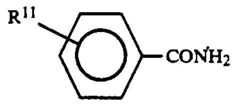
(III)

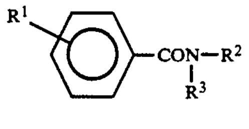
(IV)

wherein $R^1$ represents hydrogen, an alkyl group having 1 to 6 carbon atoms, which may have a substituent, an alkoxyl group having 1 to 6 carbon atoms, which may have a substituent, an aryl group such as a phenyl group, a biphenyl group, a naphthyl group and an anthranyl group, which may have a substituent, an acyl group, an acyloxy group, a halogen, a nitro group, a hydroxyl group, a cyano group, a carboxyl group or an ester group thereof, a carbamoyl group which may have a substituent, a sulfo group or an ester group thereof, or an amino group which may have a substituent selected from the group consisting of an alkyl group having 1 to 6 carbon atoms, a phenyl group and a substituted phenyl group; and $R^2$ and $R^3$ each represent hydrogen, an alkyl group having 1 to 6 carbon atoms, which may have a substituent, an alkoxyl group having 1 to 6 carbon atoms, which may have a substituent, or an aryl group such as a phenyl group, a biphenyl group, a naphthyl group and an anthranyl group, which may have a substituent.

The substituent of the above alkyl group, alkoxyl group or aryl group represented by $R^1$, $R^2$ and $R^3$ in formulas (I) to (IV) is selected from the group consisting of an acyl group, an acyloxy group, a halogen, a nitro group, a hydroxyl group, a cyano group, a carboxyl group or an ester group thereof, a carbamoyl group which may have a substituent, a sulfo group or an ester group thereof, and an amino group which may have a substituent selected from the group consisting of an alkyl group having 1 to 6 carbon atoms, a phenyl group and a substituted phenyl group. The alkyl group or alkoxyl group represented by $R^1$, $R^2$ and $R^3$ may be straight-chain or branched, and the alkyl group or alkoxyl group having 2 or more carbon atoms may have one or more unsaturated bond in carbon chain.

The above-mentioned n-alkane derivatives are compounds having one, or two or more double bond or triple bond in carbon chain thereof; compounds in which one or more hydrogen atoms are substituted by a halogen; and compounds in which a benzene ring which may be substituted by an alkyl group or an alkoxyl group is linked to a carbon atom at the end.

Examples of n-alkane for use in the present invention are n-alkane such as tetracosane, pentacosane, hexacosane, heptacosane, octacosane, nonacosane, triacontane, dotriacontane, tetratriacontane, hexatriacontane, octatriacontane and tetracontane; and a mixture mainly consisting of the above-mentioned n-alkane, such as paraffin and paraffin wax.

Examples of n-alkane derivatives include 1-hexacosene, 1-heptacosene, 1-octacosene, 1-triacontene, 1-tetratriacontene, 1-hexatriacontene, 1-octatriacontene, 1-tetracontene, docosyl benzene, tetracosyl benzene, hexacosyl benzene, octacosyl benzene, triacontyl benzene, tritriacontyl benzene, tetratriacontyl benzene, hexatriacontyl benzene, 1,18-dibromooctadecane, 1,20-dibromoeicosane and 1,22-dibromodocosane.

As the substrate of the heat-mode recording medium according to the present invention, a glass plate, metallic plate or plastic plate made of, for example, polymethyl methacrylate or polycarbonate can be employed.

In the case where a light-to-heat conversion layer is provided in the recording medium to record information by the application of light to the recording medium, the light-to-heat conversion layer may be a metal layer comprising Pt, Ti, Si, Cr, Ni, Ge, Al, Bi, In or Mn.

Alternatively, the light-to-heat conversion layer may comprise a light-absorbing dyestuff capable of absorbing the light applied to the recording medium, for example, azo-type dye, cyanine-type dye, naphthoquinone-type dye, anthraquinone-type dye, phthalocyanine-type dye, naphthalocyanine-type dye, squalium-type dye, dithiol complex type dye and azulenium-type dye.

Instead of providing a light-to-heat conversion layer, the above-mentioned light-to-heat conversion materials may be directly contained in the recording layer. To further improve the recording sensitivity of the recording medium, the light-to-heat conversion layer may be provided in the recording medium and the light-to-heat conversion materials may be contained in the recording layer at the same time.

Examples of the material for the undercoat layer 14 as shown in FIG. 7 for use in the present invention are polyvinyl chloride, vinyl chloride—vinyl acetate copolymer, vinyl chloride—acrylate copolymer, polyvinylidene chloride, polyester, polyamide, polyimide, polycarbonate, polyurethane, acrylic resin and silicone resin.

For the protective layer 15 as shown in FIG. 8 for use in the present invention, the same resins as employed in the undercoat layer 14 can be used. In addition to the above, a glass plate is applicable to the protective layer 15. In the case where a glass plate is employed as the protective layer, the above-mentioned resins may be laminated on the glass plate in such a fashion that the resins are brought into contact with the recording layer to control the crystallization direction thereof and improve the uniformity of crystallization thereof. Alternatively, the glass plate may be surface-treated using a silane-type finishing agent or titanate-type finishing agent to improve the surface properties of the glass plate.

As mentioned previously, the heat-mode recording medium according to the present invention can be prepared by forming an organic compound for a recording layer into a thin film, fusing the organic compound as in its thin-film state under application of heat thereto, and cooling the fused organic compound in a predetermined crystallization direction.

More specifically, a light-to-heat conversion layer is formed on a substrate when necessary by deposition or sputtering of the above-mentioned metal. On the light-to-heat conversion layer, an organic compound for a recording layer is formed in a thin film by any conventional methods capable of uniformly forming a film, such as vapor-deposition, sputtering or solution-coating. The thin film of the organic compound is fused with application of heat thereto.

It is necessary that the organic compound be maintained in its uniform thin film state in the course of fusing. When the wetting of the fused solution of the organic compound to the light-to-heat conversion layer is good, the organic compound can be maintained in a thin-film state in the course of fusing. However, in the case where the light-to-heat conversion layer repels the fused solution of the organic compound owing to its poor wetting property, the organic compound cannot be maintained in a thin-film state. In such a case, an undercoat layer may be provided on the light-to-heat conversion layer to improve the wetting of the fused solution of the organic compound.

Alternatively, the thin-film state of the fused solution of the organic compound can be maintained by holding it between the light-to-heat conversion layer and a protective layer to be overlaid on the recording layer. In this manner, for example, a predetermined space may be secured between the light-to-heat conversion layer and the protective layer by inserting spacers or finely-divided particles of a gap material and the fused solution of the organic compound for the recording layer may be filled therein. Alternatively, the protective layer may be provided on the recording layer which has been formed with a predetermined thickness and the recording layer is then fused under application of heat thereto.

When the recording layer is sandwiched between a pair of substrates, the spacer, such as a polymeric film, polymeric sphere, polymeric fiber, or finely-divided particles of $Al_2O_3$ may be inserted between substrates to control the thickness of the thin-film recording layer comprising the organic compound.

The fused solution of the organic compound maintained in a thin-film state which is formed on the disk-shaped substrate (or the light-to-heat conversion layer) is crystallized in the direction of radiations outward from the center of the substrate or inward thereto, or along the circumference of the substrate.

Figure 13:
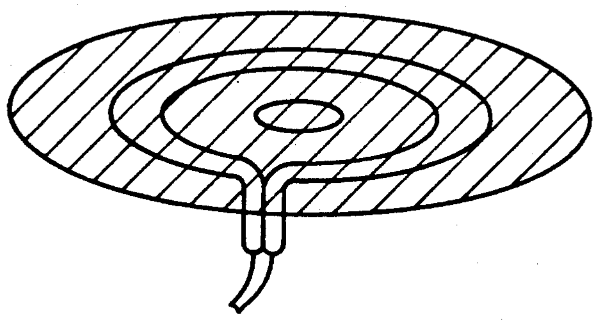
FIGS. 13, 14(*a*) and 14(*b*) are views explaining a method of forming an organic layer of a heat-mode recording medium according to the present invention in which each crystalline domain is oriented in a radial manner.
Figure 14A:
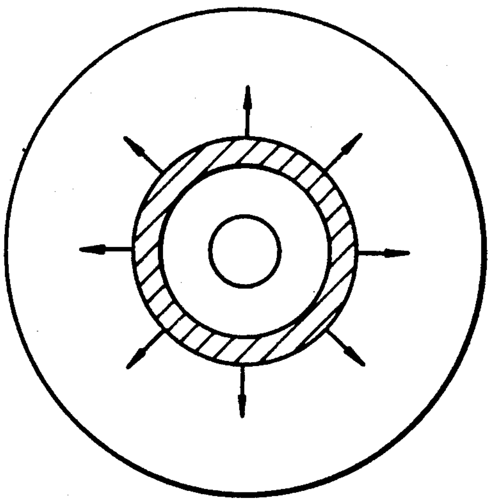
Figure 14B:
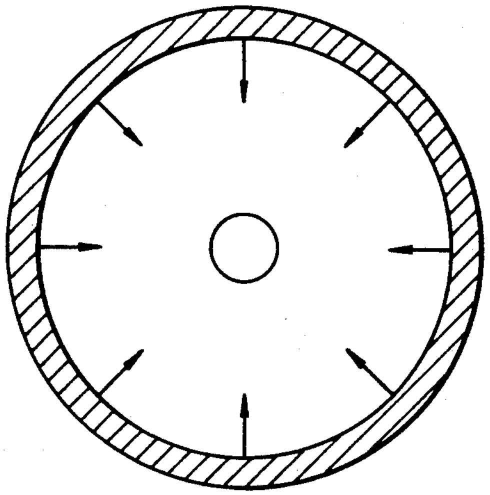

To crystallize the fused organic compound in a radial direction from the center, a ring heater of which diameter is variable as shown in FIG. 13 may be employed. As shown in FIG. 14(*a*), a ring-shaped portion (shaded portion shown in the figure) of the organic compound for the recording layer is fused by bringing the ring heater close to or into contact with the substrate of the heat-mode recording medium according to the present invention, with the center of the substrate coincided with the center of the ring heater. As the diameter of the ring heater is increased, the ring-shaped fused portion is shifted and the crystallization of the fused portion proceeds outward in a radial direction. In contrast to this, as the diameter of the ring heater is decreased as shown in FIG. 14(*b*), the ring-shaped fused portion (shaded portion in the figure) of the organic compound is moved to the center and the fused portion is thus crystallized inward in a radial direction.

There is another method of crystallizing the organic compound of the recording layer in a radial direction.

A disk-shaped metal plate of copper, aluminum, iron or stainless steel which is larger than a substrate of a recording medium is heated in advance to a temperature much higher than the temperature of an organic compound employed in a recording layer. A substrate which holds a thin-film layer of the organic compound serving as the recording layer is placed on the disk-shaped metal plate to fuse the above-mentioned organic compound as a whole by the heat conducted to the substrate through the metal plate. Subsequently, a copper tube through which a refrigerant carrier is circulated is brought into contact with the center of the disk-shaped metal plate. As a result, the center of the substrate is intensively cooled and the temperature of a portion of the organic compound corresponding to the center of the substrate which is intensively cooled is decreased lower than the freezing point of the organic compound. The organic compound of the recording layer is cooled radially from the center of the substrate. An area where the temperature of the organic compound is decreased below its freezing point is gradually spread from the center of the substrate, and finally the entire substrate is cooled. This can be accompanied by the crystallization of the organic compound radially from the center of the substrate in an outward direction.

Reversely, when the disk-shaped metal plate is cooled from the vicinity of its circumference, the temperature of the substrate can be uniformly lowered from the circumference to the center thereof and the organic compound employed for the recording layer can be crystallized inward from the circumference thereof.

Figure 15:
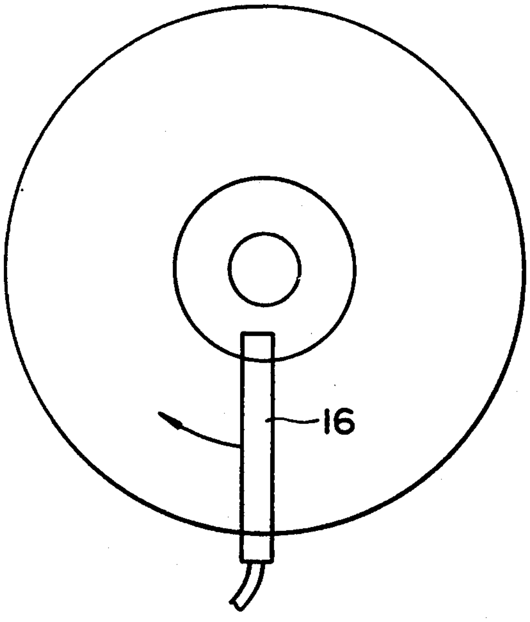
FIG. 15 is a view explaining a method of forming an organic layer of a disk-shaped heat-mode recording medium according to the present invention in which each crystalline domain is oriented in a circumferential direction of the recording medium.

To crystallize the organic compound of the recording layer in a circumferential direction, a rod heater 16 which is connected to a heat controller (not shown) is brought close to or into contact with the substrate or the recording layer on the substrate as shown in FIG. 15. As a result, a belt-shape portion of the organic compound in the recording layer corresponding to the rotation of the rod heater is fused. As the rod heater 16 is moved in the direction of an arrow as shown in FIG. 15, the organic compound is subsequently fused in the shape of a belt and then crystallized in a circumferential direction as shown by the arrow in FIG. 15.

Figure 16:
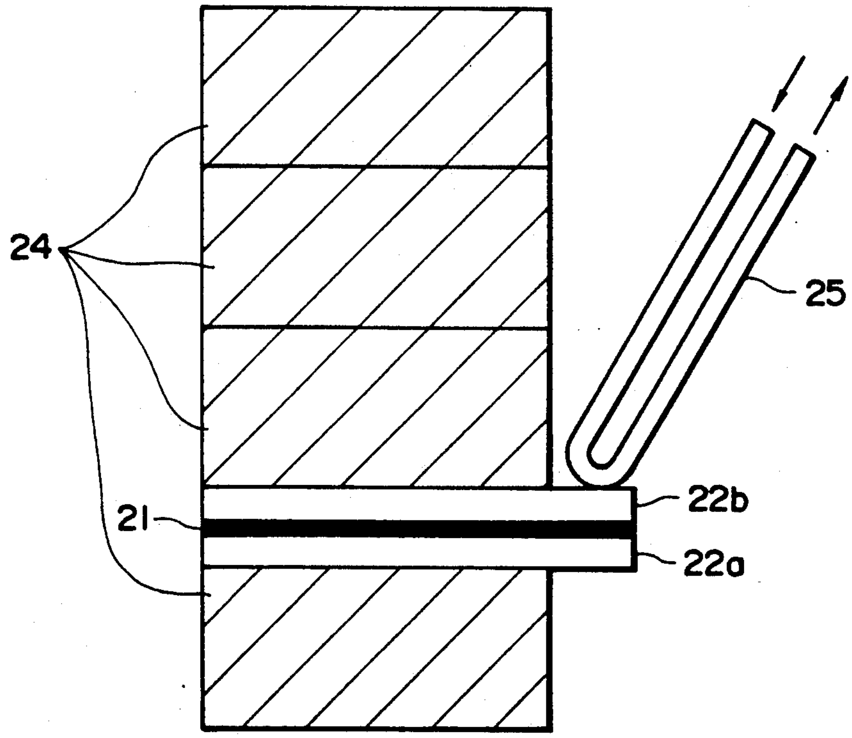
FIG. 16 is a schematic cross-sectional view explaining a representative method of preparing and initializing a heat-mode recording medium according to the present invention.

Referring to FIG. 16, the method of preparing a preferable embodiment of the heat-mode recording medium according to the present invention will now be explained in detail.

In FIG. 16, the heat-mode recording medium is constructed in such a manner that a recording layer 21 comprising a fatty acid is interposed between a pair of substrates 22*a* and 22*b*.

A predetermined amount of the fatty acid is fused on the substrate 22*a* which is heated higher than the melting point of the above fatty acid. The other substrate 22*b* is placed on the fused fatty acid. The whole recording medium including a pair of substrates 22*a* and 22*b* is allowed to stand for several minutes until the temperature becomes uniform as a whole. Subsequently, a pressure is applied to the upper substrate 22*b* to spread the fused solution of the fatty acid uniformly between a pair of the substrates 22*a* and 22*b*. Thus, a recording layer 21 comprising the fatty acid can be formed between a pair of the substrates 22*a* and 22*b*. The recording layer is then supercooled, with application of a load to the recording layer by placing weights 24 thereon as shown in FIG. 16.

Provided that the fatty acid employed in the above recording layer has a melting point of (Tm) in its original powdery state before formed in a thin film, the above-mentioned supercooling temperature, hereinafter referred to as a temperature of (To), is a temperature lower than the temperature (Tm), at which the fatty acid is not crystallized. The initiating temperature for crystallization is lowered when the fatty acid is formed in a thin film.

The recording layer 21 maintained at the supercooling temperature (To) is partially and intensively cooled by bringing a copper tube 25 through which cooling water is circulated into contact with a portion of the substrate 22*b*, as shown in FIG. 16. The crystallization is initiated from the above portion of the recording layer and then the crystal growth is proceeding to complete the crystallization of the whole recording layer.

After the completion of crystallization, the recording layer is heat-treated at a temperature lower than the melting point of the fatty acid by 5° C. to 40° C. in order to adjust the strain of crystals. Then, the recording medium is cooled to room temperature and the weights 24 are taken away.

The thus obtained recording layer, which is composed of crystalline domains, is excellent with respect to the uniformity of film thickness and refractive index.

The above-mentioned advantage is not limited to the case where a fatty acid is employed for the recording layer, but all the organic compounds comprising at least one of the above-mentioned fatty acids and derivatives thereof are applicable.

Other features of this invention will become apparent in the course of the following description of exemplary embodiments, which are given for illustration of the invention and are not intended to be limiting thereof.

EXAMPLE 1

As shown in FIG. 16, 1.5 mg of behenic acid with a purity of 99% having a melting point of 79.6° C. was fused on a 50 mm×50 mm glass substrate 22*a* with a thickness of 1.2 mm. The other substrate 22*b* was placed on the fused behenic acid, so that a recording medium comprising a pair of substrates and a recording layer comprising behenic acid can be obtained.

The thus obtained recording medium was heated to 90° C. in a vacuum heating oven and subjected to deaeration.

The recording medium was allowed to stand in a constant temperature bath maintained at 90° C. for 2 hours, with a 4-kg weight 24 applied to the substrate 22*b*. Subsequently, the temperature of the constant temperature bath was decreased at a rate of 1° C./min and the temperature of the recording medium was maintained at 78.5° C. to place it in a super-cooling state. The crystal growth was not observed on the recording layer 21 at this temperature by a polarizing microscopic observation.

A portion of the above prepared recording medium was brought into contact with a copper tube 25 through which cooling water was circulated, as shown in FIG. 16, to intensively cool the above portion. From the cooled portion of the recording layer 21, which became nuclear for the crystal growth, crystallization was initiated.

After the recording medium was placed in a supercooling state for two hours, the temperature of the thermostatic chamber was decreased at a rate of 1° C./min to a room temperature. After the completion of crystallization of the recording layer 21, it was found by a polarizing microscope that the recording layer 21 in its entirety was composed of a single crystalline domain.

The thus crystallized recording layer 21 was allowed to stand in a thermostatic chamber maintained at 65° C. for 10 hours, and then cooled to room temperature, with the temperature of the thermostatic chamber decreased at a rate of 1° C./min. The recording medium was taken from the thermostatic chamber, whereby heat-mode recording medium No. 1 according to the present invention was prepared.

The recording layer 21 comprising behenic acid of the heat-mode recording medium No. 1 was inspected by a polarizing microscope and it was confirmed that the thickness and refractive index of the recording layer 21 was entirely uniform and that the recording layer in its entirety was composed of a single crystalline domain.

EXAMPLE 2

Figure 17:
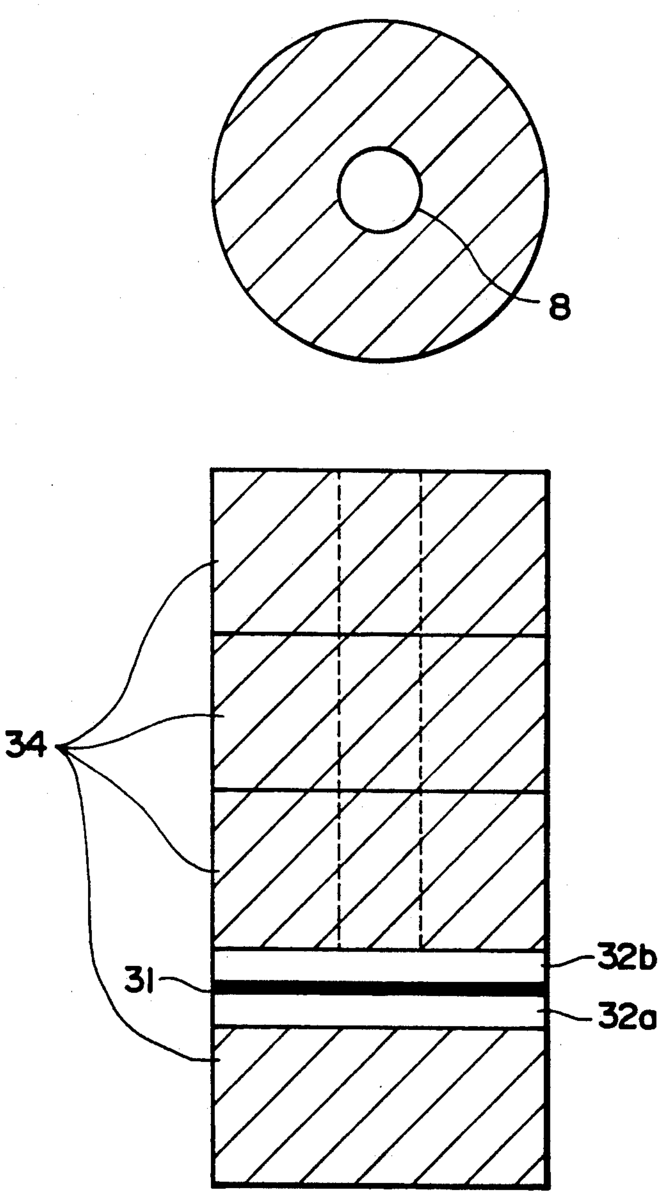
FIG. 17 is a schematic view explaining a method of preparing a disk-shaped heat-mode recording medium according to the present invention.

As shown in FIG. 17, 1.8 mg of stearic acid with a purity of 99% having a melting point of 68.9° C. was fused on a glass substrate 32*a* with a diameter of 50 mm and a thickness of 1.2 mm. Another substrate 32*b* was placed on the fused stearic acid, so that a recording medium comprising a pair of substrates 32*a* and 32*b* and a recording layer 31 comprising stearic acid can be obtained.

The thus obtained recording medium was heated to 80° C. in a vacuum heating oven and subjected to deaeration.

The recording medium was allowed to stand in a thermostatic chamber maintained at 80° C. for 2 hours, with application of a 4 kg weight 34 having a hole 8 at the center thereof to the substrate 32*b*. Subsequently, the temperature of the thermostatic chamber was decreased at a rate of 1° C./min and the temperature of the recording medium was maintained at 67.3° C. to place it in a supercooling state. The crystal growth was not observed on the recording layer 31 at this temperature by a polarizing microscope.

A copper tube 25 through which cooling water was circulated, as shown in FIG. 16, was passed through the hole 8 of the weight 34 and brought into contact with the center of the above prepared recording medium to intensively cool the above center portion. From this cooled center portion of the recording layer 31, which became a nuclear for the crystal growth, crystallization was initiated.

After the recording medium was placed in a supercooling state for two hours, the temperature of the thermostatic chamber was decreased at a rate of 1° C./min to room temperature. After the completion of crystallization of the recording layer 31, it was found by a polarizing microscope that the recording layer 31 in its entirety was composed of a single crystalline domain.

The thus crystallized recording layer 31 was allowed to stand in a thermostatic chamber maintained at 55° C. for 10 hours, and then cooled to room temperature, with the temperature of the thermostatic chamber decreased at a rate of 1° C./min. The recording medium was taken from the thermostatic chamber, a heat-mode recording medium was preapred.

The recording layer 31 comprising stearic acid of the heat-mode recording medium was inspected by a polarizing microscope and it was confirmed that the thickness and refractive index of the recording layer 31 was entirely uniform and that the recording layer in its entirety was composed of a single crystalline domain.

A hole was bored through the heat-mode recording medium at the center thereof, so that a heat-mode recording medium No. 2 according to the present invention, which is a doughnut-shaped recording medium, was obtained. This recording medium showed uniform optical characteristics in a circumferential direction thereof.

EXAMPLE 3

Chromium was vapor-deposited on a 4-inch disk-shaped glass substrate having a thickness of 1.2 mm which had been subjected to optical polish, so that a chromium layer serving as a light reflection layer and light-to-heat conversion layer was formed with a thickness of about 900 Å on the glass substrate.

On one side of a glass plate having a thickness of 0.2 mm serving as a protective layer, a small amount of finely-divided particles of silica with a diameter of about 1 μm was deposited as a gap material.

The above-prepared glass substrate holding the chromium layer, and the protective layer were separately heated in a thermostatic chamber maintained at 100° C.

A small amount of commercially available behenic acid with a purity of 99% (made by Sigma Corporation) was placed on the chromium layer which was formed on the glass substrate to fuse it at 100° C.

The fused behenic acid held on the chromium layer was carefully covered with the protective layer from one end to the other end, with the silica particles-deposited side of the protective layer brought into contact with the fused behenic acid. As a result, the fused behenic acid was caused to spread over the chromium layer, so that a recording layer was uniformly formed on the chromium layer. The thus formed recording layer was gradually cooled for crystallization, with a weight placed on the protective layer to uniformly apply pressure to the recording layer. The thickness of the recording layer was about 0.8 μm. When observed by a polarizing microscope employing a crossed nicol, it was found that the recording layer was composed of numerous crystalline domains, each oriented in different directions.

A copper plate having a diameter of 50 cm and a thickness of 5 mm, with attachment thereto of a copper pipe through which cold water was circulated, which is capable of cooling a center part of the copper plate equivalent to a circular area with a diameter of 50 mm from the center thereof, was uniformly heated to 100° C.

The above-prepared recording medium was placed at the center of the heated copper plate to fuse the crystallized behenic acid of the recording layer. Subsequently, the center of the copper plate was cooled by circulating cold water of 5° C. through the copper pipe. At an initial stage, the center of the fused behenic acid in a thin film state was crystallized, and the crystallized portion uniformly spread radially from the center. Finally, the crystallization of the fused behenic acid in a thin film state was completed. It was confirmed by a polarizing microscope that the recording layer was composed of numerous crystalline domains, each oriented substantially uniformly in a radial direction from the center of the recording layer. Thus, a heat-mode recording medium No. 3 according to the present invention was prepared, and initialized at the same time.

A semiconductor laser beam having a wavelength of 830 nm was converged on a 1 μm-diameter spot and spirally applied to the above-prepared heat-mode recording medium No. 3 according to the present invention in such a fashion that the intensity of the laser beam on the surface of the recording medium was 8 mW, with the recording medium rotated at a revolution of 900 rpm.

After the completion of application of the semiconductor laser beam, the heat-mode recording medium No. 3 according to the present invention was observed by a polarizing microscope. On the recording layer, a dark recorded portion corresponding to a portion exposed to the semiconductor laser beam was linearly observed in a uniformly light non-recorded portion corresponding to a portion unexposed to the semiconductor laser beam. Even though the observation position was moved, with the relation between the vibration direction of the polarized light emitting from a light source of the microscope to the recording medium and the orientation direction of crystalline domains of behenic acid being fixed, the conditions of recorded portion and non-recorded portion on the recording layer were almost constant. It was confirmed that information can be accurately reproduced when the polarized light for reproduction was applied to the heat-mode recording medium No. 3 according to the present invention, with the recording medium being rotated.

EXAMPLE 4

Chromium was vapor-deposited on a 4-inch disk-shaped glass substrate having a thickness of 1.2 mm which had been subjected to optical polish, so that a chromium layer serving as a light reflection layer and light-to-heat conversion layer was formed with a thickness of about 900 Å on the glass substrate.

A 5 wt. % tetrahydrofuran solution of commercially available vinyl chloride—vinyl acetate copolymer, "VYHH" (Trademark), made by Union Carbide Japan K.K. was coated on the above-prepared chromium layer and dried, so that an undercoat layer with a thickness of about 0.2 μm was formed on the chromium layer.

A 10 wt. % tetrahydrofuran solution of commercially available stearic acid (made by Sigma Corporation) with a purity of 99% was coated on the above-prepared undercoat layer and dried at 45° C., so that a recording layer was prepared on the undercoat layer.

The same tetrahydrofuran solution of vinyl chloride—vinyl acetate copolymer as employed in the undercoat layer was coated on the above-prepared recording layer and dried at 45° C., so that a protective layer was formed on the recording layer. The thus prepared recording medium was subjected to heat treatment at 90° C. for about 2 minutes and subsequently cooled, so that the thickness of the recording layer comprising stearic acid was adjusted to about 0.8 μm and the protective layer comprising vinyl chloride—vinyl acetate copolymer to about 0.6 μm.

A copper plate having a diameter of 50 cm and a thickness of 5 mm, with attachment thereto of a copper pipe through which cold water was circulated, which is capable of cooling a center part of the copper plate equivalent to a circular area with a diameter of 50 mm from the center thereof, was uniformly heated to 90° C.

The above-prepared recording medium was placed at the center of the heated copper plate to fuse the crystallized stearic acid of the recording layer. Subsequently, the center of the copper plate was cooled by circulating cold water of 5° C. through the copper pipe. At an initial stage, the center of the fused stearic acid in a thin film state was crystallized, and the crystallized portion was uniformly spread radially from the center. Finally, the crystallization of the fused stearic acid in a thin film state was completed. It was confirmed by a polarizing microscope that the recording layer was composed of numerous crystalline domains, each oriented substantially uniformly in a radial direction from the center of the recording layer. Thus, a heat-mode recording medium No. 4 according to the present invention was prepared and initialized at the same time.

A semiconductor laser beam having a wavelength of 830 μm was converged on a 1 μm-diameter spot and spirally applied to the above-prepared heat-mode recording medium No. 4 according to the present invention in such a fashion that the intensity of the laser beam on the surface of the recording medium was 5 mW, with the recording medium rotated at a revolution of 900 rpm.

After the completion of application of the semiconductor laser beam, the heat-mode recording medium No. 4 according to the present invention was observed by a polarizing microscope. On the recording layer, a dark recorded portion corresponding to a portion exposed to the semiconductor laser beam was linearly observed in a uniformly light non-recorded portion corresponding to a portion unexposed to the semiconductor laser beam. Even though the observation position was moved, with the relation between the vibration direction of the polarized light emitting from a light source of the microscope to the recording medium and the orientation direction of crystalline domains of stearic acid being fixed, the conditions of the recorded portion and non-recorded portion on the recording layer were almost constant. It was confirmed that information can be accurately reproduced when the polarized light for reproduction was applied to the heat-mode recording medium No. 4 according to the present invention, with the recording medium being rotated.

EXAMPLE 5

Chromium was vapor-deposited on a 4-inch disk-shaped glass substrate having a thickness of 1.2 mm which had been subjected to optical polish, so that a chromium layer serving as a light reflection layer and light-to-heat conversion layer was formed with a thickness of about 900 Å on the glass substrate.

A 10 wt. % tetrahydrofuran solution of commercially available stearic acid (made by Sigma Corporation) with a purity of 99% was coated on the above-prepared undercoat layer and dried at 45° C., so that a recording layer was prepared on the chromium layer.

A 5 wt. % tetrahydrofuran solution of commercially available vinyl chloride—vinyl acetate copolymer, "VYHH" (Trademark), made by Union Carbide Japan K.K. was coated on the above recording layer and dried at 45° C., so that a protective layer with a thickness of about 0.2 μm was formed on the recording layer.

The thus prepared recording medium was subjected to heat treatment at 90° C. for about 2 minutes and subsequently cooled down, so that the thickness of the recording layer comprising stearic acid was controlled to about 0.8 μm and the protective layer comprising vinyl chloride—vinyl acetate copolymer to about 0.6 μm.

A rod heater 16 was brought into contact with the back side of the glass substrate to increase the temperature of the recording layer, as shown in FIG. 15. A portion of the recording layer where the stearic acid was sufficiently heated was partially fused. As the rod heater 16 was rotated in a clockwise direction, as shown in FIG. 15, the stearic acid was fused in the same direction, followed by the crystallization consequently.

It was confirmed by a polarizing microscope that the recording layer was composed of numerous crystalline domains, each oriented in a direction of circumference of the recording layer. Thus, a heat-mode recording medium No. 5 according to the present invention was prepared and initialized at the same time.

A semiconductor laser beam having a wavelength of 830 nm was converged on a 1 μm-diameter spot and spirally applied to the above-prepared heat-mode recording medium No. 5 according to the present invention in such a fashion that the intensity of the laser beam on the surface of the recording medium was 5 mW, with the recording medium rotated at a revolution of 900 rpm.

After the completion of application of the semiconductor laser beam, the heat-mode recording medium No. 5 according to the present invention was observed by a polarizing microscope. On the recording layer, a dark recorded portion corresponding to a portion exposed to the semiconductor laser beam was linearly observed in a uniformly light non-recorded portion corresponding to a portion unexposed to the semiconductor laser beam. Even though the observation position was moved, with the relation between the vibration direction of the polarized light emitting from a light source of the microscope to the recording medium and the orientation direction of crystalline domains of stearic acid being fixed, the conditions of the recorded portion and non-recorded portion on the recording layer were almost constant. It was confirmed that information can be accurately reproduced when the polarized light for reproduction was applied to the heat-mode recording medium No. 5 according to the present invention, with the recording medium being rotated.

As previously mentioned, the recording and erasing operations are performed using the heat-mode recording medium according to the present invention, not by forming a pit in the recording layer and changing the surface shape of the recording layer, but by changing the crystalline state of an organic compound employed for the recording layer in a thin-film. Therefore the heat-mode recording medium according to the present invention is capable of recording and erasing information without difficulty by the appropriate temperature control of the recording layer for crystallizing and cooling the organic compound contained therein. A portion where information is recorded can be detected by the difference in the polarization characteristics, so that the contrast of the recorded portion to the non-recorded portion on the recording layer is very high. This will be accompanied by high-speed reproduction with high reliability.

What is claimed is:

1. A heat-mode recording medium comprising:

(a) a substrate and (b) a recording layer formed thereon comprising a thin film of an organic material having a regularly oriented crystallization direction which can be thermally and reversibly controlled, wherein said organic material is a fatty acid or fatty acid derivative having 10 or more carbon atoms.

2. The heat-mode recording medium as claimed in claim 1, wherein said organic material is crystallized by the steps of melting said organic material; supercooling said melted organic material and crystallizing said supercooled organic material in its entirely by further cooling said organic material locally.

3. The heat-mode recording medium as claimed in claim 1, wherein said crystallized organic material has an optical axis extending in a radial direction from a predetermined center thereof.

4. The heat-mode recording medium as claimed in claim 1, wherein said substrate is disc-shaped and said organic material consists of an aggregation of crystal domains.

5. The heat-mode recording medium as claimed in claim 4, wherein said crystal domains are directed in a radial direction from the center of said substrate.

6. The heat-mode recording medium as claimed in claim 4, wherein said crystal domains are directed in a tangential direction of concentric circles having its center at the center of said disc-shaped substrate.

7. The heat-mode recording medium as claimed in claim 1, wherein said organic material is a benzoic acid derivative having formula (I):

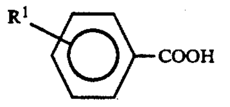

(I)

wherein $R^1$ represents hydrogen, an alkyl group having 1 to 6 carbon atoms, which may have a substituent, an alkoxyl group having 1 to 6 carbon atoms, which may have a substituent, an aryl group which may have a substituent, an acyl group, an acyloxy group, a halogen, a nitro group, a hydroxyl group, a cyano group, a carboxyl group or an ester group thereof, a carbamoyl group which may have a substituent, a sulfo group or an ester group thereof, or an amino group which may have a substituent selected from the group consisting of an alkyl group having 1 to 6 carbon atoms, a phenyl group and a substituted phenyl group.

8. The heat-mode recording medium as claimed in claim 7, wherein said substituent of said alkyl group, said alkoxyl group or said aryl group represented by $R^1$ is selected from the group consisting of an acyl group, an acyloxy group, a halogen, a nitro group, a hydroxyl group, a cyano group, a carboxyl group or an ester group thereof, a carbamoyl group which may have a substituent, a sulfo group or an ester group thereof, and an amino group which may have a substituent selected from the group consisting of an alkyl group having 1 to 6 carbon atoms, a phenyl group and a substituted phenyl group.

9. The heat-mode recording medium as claimed in claim 1, wherein said organic material is a benzoic acid compound having formula (II):

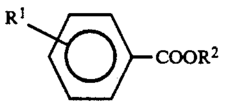

(II)

wherein $R^1$ represents hydrogen, an alkyl group having 1 to 6 carbon atoms, which may have a substituent, an alkoxyl group having 1 to 6 carbon atoms, which may have a substituent, an aryl group which may have a substituent, an acyl group, an acyloxy group, a halogen, a nitro group, a hydroxyl group, a cyano group, a carboxyl group or an ester group thereof, a carbamoyl group which may have a substituent, a sulfo group or an ester group thereof, or an amino group which may have a substituent selected from the group consisting of an alkyl group having 1 to 6 carbon atoms, a phenyl group and a substituted phenyl group; and $R^2$ represents hydrogen, an alkyl group having 1 to 6 carbon atoms, which may have a substituent, an alkoxy group having 1 to 6 carbon atoms, which may have a substituent, or an aryl group which may have a substituent.

10. The heat-mode recording medium as claimed in claim 9, wherein said substituent of said alkyl group, said alkoxy group or said aryl group represented by $R^1$ is selected from the group consisting of an acyl group, an acyloxy group, a halogen, a nitro group, a hydroxyl group, a cyano group, a carboxyl group or an ester group thereof, a carbamoyl group which may have a substituent, a sulfo group or an ester group thereof, and an amino group which may have a substituent selected from the group consisting of an alkyl group having 1 to 6 carbon atoms, a phenyl group and a substituted phenyl group.

11. The heat-mode recording medium as claimed in claim 1, wherein said organic material is a benzoic acid compound having formula (III):

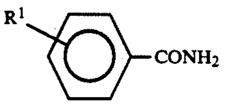

(III)

wherein $R^1$ represents hydrogen, an alkyl group having 1 to 6 carbon atoms, which may have a substituent, an alkoxyl group having 1 to 6 carbon atoms, which may have a substituent, an aryl group which may have a substituent, an acyl group, an acyloxy group, a halogen, a nitro group, a hydroxyl group, a cyano group, a carboxyl group or an ester group thereof, a carbamoyl group which may have a substituent, a sulfo group or an ester group thereof, or an amino group which may have a substituent selected from the group consisting of an alkyl group having 1 to 6 carbon atoms, a phenyl group and a substituted phenyl group.

12. The heat-mode recording medium as claimed in claim 11, wherein said substituent of said alkyl group, said alkoxyl group or said aryl group represented by $R^1$ is selected from the group consisting of an acyl group, an acyloxy group, a halogen, a nitro group, a hydroxyl group, a cyano group, a carboxyl group or an ester group thereof, a carbamoyl group which may have a substituent, a sulfo group or an ester group thereof, and an amino group which may have a substituent selected from the group consisting of an alkyl group having 1 to 6 carbon atoms, a phenyl group and a substituted phenyl group.

13. The heat-mode recording medium as claimed in claim 1, wherein said organic material is a benzoic acid compound having formula (IV):

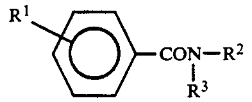
(IV)

wherein $R^1$ represents hydrogen, an alkyl group having 1 to 6 carbon atoms, which may have a substituent, an alkoxyl group having 1 to 6 carbon atoms, which may have a substituent, an aryl group which may have a substituent, an acyl group, an acyloxy group, a halogen, a nitro group, a hydroxyl group, a cyano group, a carboxyl group or an ester group thereof, a carbamoyl group which may have a substituent, a sulfo group or an ester group thereof, or an amino group which may have a substituent selected from the group consisting of an alkyl group having 1 to 6 carbon atoms, a phenyl group and a substituted phenyl group; and $R^2$ and $R^3$ each represent hydrogen, an alkyl group having 1 to 6 carbon atoms, which may have a substituent, an alkoxyl group having 1 to 6 carbon atoms, which may have a substituent, or an aryl group which may have a substituent.

14. The heat-mode recording medium as claimed in claim 13, wherein said substituent of said alkyl group, said alkoxyl group or said aryl group represented by $R^1$ is selected from the group consisting of an acyl group, an acyloxy group, a halogen, a nitro group, a hydroxyl group, a cyano group, a carboxyl group or an ester group thereof, a carbamoyl group which may have a substituent, a sulfo group or an ester group thereof, and an amino group which may have a substituent selected from the group consisting of an alkyl group having 1 to 6 carbon atoms, a phenyl group and a substituted phenyl group.

15. The heat-mode recording medium as claimed in claim 1, wherein said organic material is a n-alkane derivative having a melting point of 50° C. or more.

16. The heat-mode recording medium as claimed in claim 1, wherein said fatty acid is a saturated or unsaturated mono- or di-carboxylic acid.

17. The heat-mode recording medium as claimed in claim 1, wherein said fatty acid derivative is an ester of a saturated or unsaturated mono- or di-carboxylic acid.

18. The heat-mode recording medium as claimed in claim 1, wherein said fatty acid derivative is an amide of a saturated or unsaturated mono- or di-carboxylic acid.

19. The heat-mode recording medium as claimed in claim 1, wherein said fatty acid derivative is an anilide of a saturated or unsaturated mono- or di-carboxylic acid.

20. The heat-mode recording medium as claimed in claim 1, wherein said fatty acid derivative is a hydrazide of a saturated or unsaturated mono- or di-carboxylic acid.

21. The heat-mode recording medium as claimed in claim 1, wherein said fatty acid derivative is an ureido derived from a saturated or unsaturated mono- or dicarboxylic acid.

22. The heat-mode recording medium as claimed in claim 1, wherein said fatty acid derivative is an anhydride of a saturated or unsaturated mono- or di-carboxylic acid.

23. The heat-mode recording medium as claimed in claim 1, wherein said fatty acid derivative is an ammonium salt of a saturated or unsaturated mono- or di-carboxylic acid.

24. The heat-mode recording medium as claimed in claim 1, wherein said fatty acid derivative is a metal salt of a saturated or unsaturated mono- or di-carboxylic acid.

25. The heat-mode recording medium as claimed in claim 1, wherein said recording layer is formed by the steps of fusing said organic material with application of heat thereto to form a fused portion in said recording layer, and subsequently cooling said fused portion in such a fashion that the crystallization direction of said organic material in said recording layer is oriented in a predetermined direction.

26. The heat-mode recording medium as claimed in claim 1, wherein said recording layer is formed by the steps of fusing said organic material in said recording layer in its entirety with application of heat thereto, and subsequently cooling a predetermined point of said recording layer in such a fashion that the crystallization direction of said organic material in said recording layer is oriented in a predetermined direction.

27. The heat-mode recording medium as claimed in claim 1, wherein said recording layer is formed by the steps of fusing said organic material in said recording layer in its entirety with application of heat thereto, supercooling said fused recording layer, and subsequently cooling a predetermined point of said recording layer in such a fashion that the crystallization direction of said organic material in said recording layer is oriented in a predetermined direction.

* * * * *

UNITED STATES PATENT AND TRADEMARK OFFICE
CERTIFICATE OF CORRECTION

PATENT NO. : 5,185,194
DATED : February 9, 1993
INVENTOR(S) : Miyake et al.

It is certified that error appears in the above-identified patent and that said Letters Patent is hereby corrected as shown below:

Column 1, line 29, insert --;-- after "dyes" (1st. occurrence)

Column 2, line 5, "o" should read --or--.

Column 4, line 30, "ca" should read --can--.

Column 7, line 21, after "acid", second occurrence, delete "." and insert --,--;

line 53, formula (III), "$R^{11}$" should read --$R^1$--.

Column 13, line 27, "preapred" should read --prepared--.

Column 17, line 24, insert --,-- after "substrate";

line 34, "entirely" should read --entirety--.

Signed and Sealed this
Fifth Day of April, 1994

Attest:

Bruce Lehman

BRUCE LEHMAN

Attesting Officer

Commissioner of Patents and Trademarks